Nov. 8, 1966  E. H. MOORE  3,283,578
LIQUID LEVEL INDICATOR
Filed Sept. 28, 1964
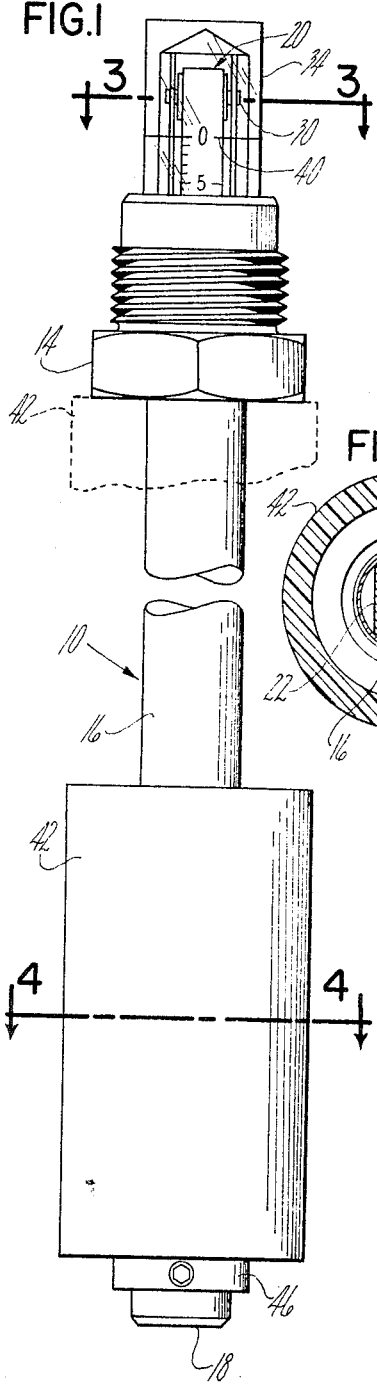
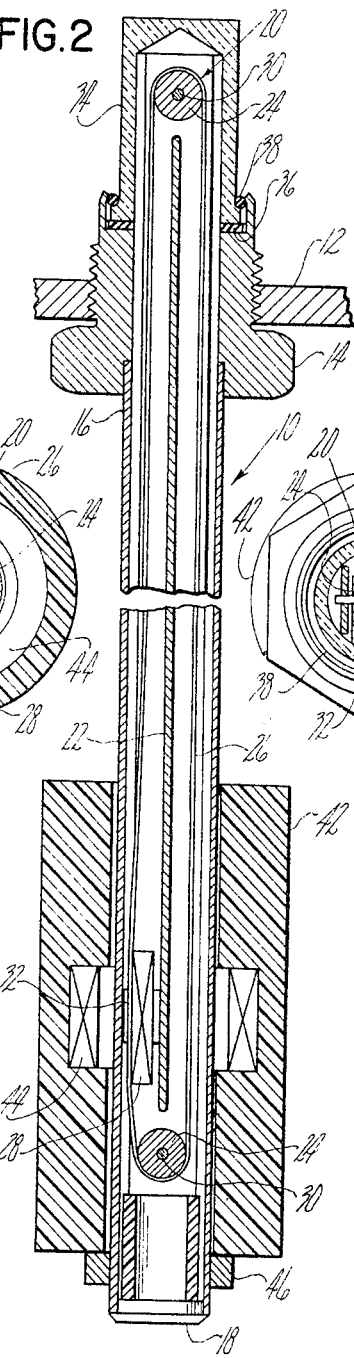
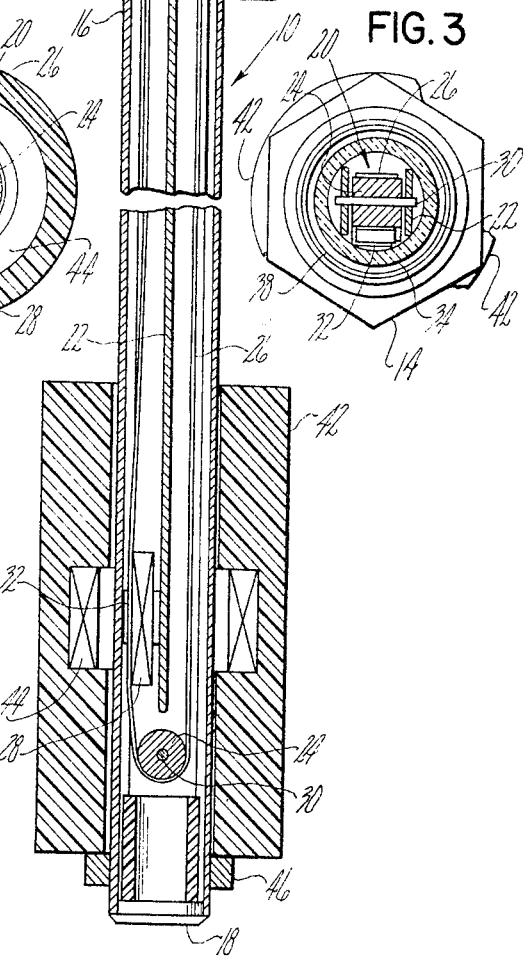
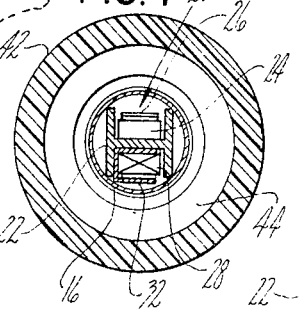
INVENTOR.
Edward H. Moore
BY
McCormick, Paulding & Huber
ATTORNEYS United States Patent Office 3,283,578
Patented Nov. 8, 1966

3,283,578
LIQUID LEVEL INDICATOR
Edward H. Moore, Avon, Conn., assignor to The Gems Company, Inc., Farmington, Conn., a corporation of Delaware
Filed Sept. 28, 1964, Ser. No. 399,710
3 Claims. (Cl. 73—321)

This invention generally relates to liquid level indicators and more specifically to immersible direct reading level indicators for liquid storage tanks and the like.

The general aim of this invention is the production of a direct reading volumetric measuring device suitable for use with all liquids including inflammable and corrosive liquids.

Another object of the invention is to provide a liquid volume measuring device readily adaptable for use with existing liquid storage tank installations.

A further object of the invention is to provide a device that will be accurate, reliable, easy to service, and of simple construction for economical manufacture.

The drawing shows a preferred embodiment of the invention and such embodiment will be described, but it will be understood that various changes may be made from the construction disclosed, and that the drawing and description are not to be construed as defining or limiting the scope of the invention, the claims forming a part of this specification being relied upon for that purpose.

Of the drawing:

FIG. 1 is a foreshortened elevation of the presently preferred embodiment of the invention with broken lines showing float movement.

FIG. 2 is a foreshortened vertical section.

FIG. 3 is a sectional view taken on the line 3—3 of FIG. 1.

FIG. 4 is a sectional view taken on the line 4—4 of FIG. 1.

The embodiment of the invention shown in FIGS. 1 and 2 of the drawing comprises an elongated nonmagnetic tubular housing assembly 10 adapted for vertical support in a liquid storage tank 12. The housing 10 comprises a threaded tank fitting 14, a tubular body 16 and a bottom cap or end plug 18. Means for vertically supporting the device in a liquid storage tank is shown as the threaded tank fitting 14, here constructed as an integral part of the housing. It should be understood, however, that a variety of supporting means may be employed and that in practice, the construction of the device will vary as necessary to adapt it to existing tank structures. An elongated tubular body 16 is joined with the tank fitting 14 by appropriate means such as welding or cementing to effect liquid-tight sealing engagement between the two members. The bottom end plug 18 provides a liquid-tight closure at the bottom end of the body 16 and also serves as a spacer to position a tape assembly, to be hereinafter described, relative to the bottom end of the housing 10.

To facilitate the assembly, adjustment and maintenance of the device, a unitary tape indicator assembly 20 is employed. The tape assembly 20 comprises a structural member or bar 22, having a pair of tape wheels 24, 24, journalled at its opposite end portions. The bar 22 is preferably elongated and has an H-shaped cross section. The web or center bar portion of the H is cut away at opposite end portions of the bar 22 to provide spaces for journalling the tape wheels 24, 24 between the side portions of the bar. A pair of axle pins 30, 30 retain the tape wheels 24, 24 in position between the side portions of the bar 22, as best shown in FIG. 3. An endless tape 26, for indicating liquid measurement, extends between and is movable on the tape wheels 24, 24. The tape 26 is marked with appropriate indicia of liquid measurement along its length. A follower magnet 28 is secured to and movable with the tape 26, for a purpose to be hereinafter discussed. In the presently preferred form of the invention, a clip 32 is employed to secure the magnet 28 to the tape 26. This arrangement permits adjustment of the magnet position relative to the tape, for convenience in calibrating the device. When the tape assembly 20 is assembled within the housing 10, the extremities of the H-shaped cross section of the bar 22 bear against the interior surfaces of the tubular body 16 thereby serving to hold the two assemblies in longitudinal coaxial alignment, as best shown in FIG. 3. The employment of a structural member having an H-shaped cross section in combination with a tubular housing results in simple construction for economical manufacture. Moreover, the unitary tape assembly 20, which is slidably assembled within the tubular housing 10, offers the advantage of being readily removable for adjustment and servicing.

In the presently preferred embodiment of the invention, a cap or transparent dome 34 is provided as a closure for the top end of the tubular housing 10. Means for effecting a liquid-tight seal between the dome 34 and the housing 10 is provided by a gasket 36 located at the point of engagement of the dome with the tank fitting 14, which comprises a part of said housing. By way of illustration, a wire retaining ring 38 is shown for retaining the dome 34 in position relative to the housing. A reference means to facilitate the direct reading of liquid measurement from the tape 26, visible through the dome 34, is provided by a reference line 40 on the dome.

A nonmagnetic toroidal member 42, adapted to float on the liquid contained in the storage tank 12, surrounds the tubular housing 10 and is slidably movable therealong. The float 42 is thereby arranged for rectilinear movement parallel to the longitudinal axis of the housing 10. The positions of the float 42 for full and empty tank conditions are shown in FIG. 1, the full tank float position being indicated by a broken line. Disposed within the float 42 is a ring magnet 44 which also surrounds the housing 10. In the presently preferred embodiment of the invention, the float 42 is preferably a plastic material having a ring magnet contained within it. However, the float may be of any suitably nonmagnetic material having physical properties compatible with the properties of the liquid to be measured. An adjustable collar 46 surrounds the bottom portion of the housing 10, and serves to retain the float 42 in position on the housing. The adjustable collar 46 may also be used in calibrating the device.

The motive force which causes the tape 26 to move upon the tape rollers 24, 24 is provided by the ring magnet 44, which is magnetically coupled to the follower magnet 28. In the presently preferred arrangement of the device, magnetic coupling is accomplished by positioning the magnet 28 with its magnetic poles attracting the magnetic poles of the ring magnet 44. The position of the float 42 relative to the housing 10 which position is obviously dependent upon the quantity of liquid in the tank 12, determines the position of the magnet 44 and the position of the magnet 28 magnetically coupled to it. The magnet 28, in turn, determines the position of the movable tape 26, which is calibrated for direct reading to indicate the quantity of liquid in the tank 12 in conjunction with the aforementioned reference line 40 on the dome 34.

It will be apparent from the foregoing disclosure that the present invention provides an immersible, direct reading liquid level indicator suitable for use with liquids of all types and adaptable for use in existing liquid storage tank installations. It will be further apparent that the advantage of simplicity, implicit in the novel unitary construction employed, enables the provision of a device that is easy to service and economical to manufacture.

The invention claimed is:
1. In a liquid level indicator the combination comprising an elongated tubular housing adapted to provide a liquid-tight enclosure, said housing being adapted for vertical support in a liquid storage tank, reference means on said housing, a float slidably mounted on said tubular housing for rectilinear movement parallel to the longitudinal axis thereof, a permanent magnet secured to and movable with said float, and a subassembly comprising an elongated structural member and a pair of tape wheels journalled at opposite end portions thereof, said subassembly also comprising a follower magnet and an endless tape having indicia of liquid measurement therealong, said tape extending between and around said tape wheels for movement thereon and said follower magnet being secured to said tape so as to move the same relative to said reference means, said subassembly being adapted to enter said housing with said structural member slidably engaging the interior surface of the housing and with said follower magnet magnetically coupled to said permanent magnet for movement therewith and for corresponding movement of the tape.

2. In a liquid level indicator the combination comprising an elongated tubular housing closed at one end and open at the other end, said housing adapted for vertical support in a liquid storage tank, a cap adapted to provide a liquid-tight closure for said other end, said cap being separable from said housing, reference means on said housing, a float slidably mounted on said housing for rectilinear movement parallel to the longitudinal axis thereof, a permanent magnet secured to and movable with said float, and a subassembly comprising an elongated structural member and a pair of tape wheels journalled at opposite end portions thereof, said subassembly also comprising a follower magnet and an endless tape having indicia of liquid measurement therealong, said tape extending between and around said tape wheels for movement thereon and said follower magnet being secured to said tape so as to move the same relative to said reference means, said subassembly being adapted to be received in assembly within said housing and to be removed therefrom when said cap is separated from said housing, said subassembly being adapted to be received within said housing with said structural member slidably engaging the interior surface thereof and with said follower magnet magnetically coupled to said permanent magnet for movement therewith and for corresponding movement of the tape.

3. The combination defined in claim 2 further defined by said structural member having a generally H-shaped cross section defining four extremities, said extremities slidably engaging said interior surface when said subassembly is received in assembly within said housing, said extremities bearing against said interior surface in assembly to maintain said member in alignment with said housing.

References Cited by the Examiner
UNITED STATES PATENTS

| 1,375,132 | 4/1921 | Cox | 73—321 |
| 1,928,620 | 10/1933 | Eynon | 73—321 |
| 2,171,899 | 9/1939 | Scheurich | 73—321 |
| 2,206,329 | 7/1940 | Olson | 73—321 X |
| 2,592,929 | 4/1952 | Matchett | 73—290.1 |

FOREIGN PATENTS

| 1,347,815 | 11/1963 | France. |
| 1,139,660 | 11/1962 | Germany. |

LOUIS R. PRINCE, *Primary Examiner.*

F. H. THOMSON, D. M. YASICH, *Assistant Examiners.*